(12) United States Patent
Nakai et al.

(10) Patent No.: US 9,472,231 B2
(45) Date of Patent: Oct. 18, 2016

(54) OPTICAL INFORMATION RECORDING MEDIUM AND RECORDING/REPRODUCING DEVICE

(71) Applicant: MITSUBISHI ELECTRIC CORPORATION, Tokyo (JP)

(72) Inventors: Kenya Nakai, Tokyo (JP); Masayuki Omaki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/651,286

(22) PCT Filed: Jan. 29, 2014

(86) PCT No.: PCT/JP2014/051894
§ 371 (c)(1),
(2) Date: Jun. 11, 2015

(87) PCT Pub. No.: WO2014/119588
PCT Pub. Date: Aug. 7, 2014

(65) Prior Publication Data
US 2015/0332726 A1 Nov. 19, 2015

(30) Foreign Application Priority Data
Feb. 4, 2013 (JP) ................................ 2013-019500

(51) Int. Cl.
*G11B 7/24065* (2013.01)
*G11B 7/24053* (2013.01)
(Continued)

(52) U.S. Cl.
CPC ......... *G11B 7/24053* (2013.01); *G11B 7/1263* (2013.01); *G11B 7/24065* (2013.01);
(Continued)

(58) Field of Classification Search
None
See application file for complete search history.

(56) References Cited

U.S. PATENT DOCUMENTS 6,965,556 B1  11/2005  Kikukawa et al.
7,087,284 B2  8/2006  Kim et al.
(Continued)

FOREIGN PATENT DOCUMENTS

JP  2001-236656 A  8/2001
JP  2001-250274 A  9/2001
(Continued)

OTHER PUBLICATIONS

Ohkubo et al., "Temperature dependence of optical constants for InSb films including molten phases", Applied Physics Letters, vol. 92, No. 011919, 2008, 4 pages.

*Primary Examiner* — Brian Butcher
(74) *Attorney, Agent, or Firm* — Birch, Stewart, Kolasch & Birch, LLP

(57) ABSTRACT

An optical information recording medium has: a recording layer; a super-resolution functional layer; and a protective layer. Letting n be the refractive index of the protective layer with respect to a laser beam focused by a focusing optical system, λ, be the wavelength of the laser beam, and $d_s$ be the depth of recording marks, when the super-resolution functional layer is irradiated by the focused laser beam, it forms a focused light spot including central light that irradiates the recording marks and peripheral light that irradiates a region outside the central light. The optical information recording medium further satisfies either the condition that the central light has a positive phase difference with respect to the peripheral light and $d_s > \lambda/4n$, or the condition that the central light has a negative phase difference with respect to the peripheral light and $d_s < \lambda/4n$.

20 Claims, 7 Drawing Sheets

(51) Int. Cl.
*G11B 7/1263* (2012.01)
*G11B 7/00* (2006.01)
*G11B 7/0045* (2006.01)
*G11B 20/12* (2006.01)
*G11B 7/0037* (2006.01)

(52) U.S. Cl.
CPC .......... *G11B7/0037* (2013.01); *G11B 7/00454* (2013.01); *G11B 2007/0006* (2013.01); *G11B 2020/1292* (2013.01); *G11B 2220/2541* (2013.01); *G11B 2220/2595* (2013.01)

(56) References Cited

U.S. PATENT DOCUMENTS

| | | |
|---|---|---|
| 2005/0018582 A1 | 1/2005 | Tanaka et al. |
| 2005/0157631 A1 | 7/2005 | Lee et al. |
| 2007/0030795 A1 | 2/2007 | Kikuawa et al. |
| 2008/0159119 A1 | 7/2008 | Minemura et al. |
| 2008/0267050 A1 | 10/2008 | Eto et al. |
| 2008/0285431 A1 | 11/2008 | Minemura et al. |
| 2013/0114385 A1 | 5/2013 | Nakai et al. |

FOREIGN PATENT DOCUMENTS

| | | |
|---|---|---|
| JP | 2005-078782 A | 3/2005 |
| JP | 2006-277929 A | 10/2006 |
| JP | 3866016 B2 | 1/2007 |
| JP | 2007-506219 A | 3/2007 |
| JP | 2007-172736 A | 7/2007 |
| JP | 2007-519143 A | 7/2007 |
| JP | 2008-041175 A | 2/2008 |
| JP | 2008-165927 A | 7/2008 |
| JP | 2008-269748 A | 11/2008 |
| JP | 2008-287795 A | 11/2008 |
| JP | 2009-037698 A | 2/2009 |
| JP | 2009-238293 A | 10/2009 |
| WO | WO 2005/029484 A1 | 3/2005 |
| WO | WO 2005/064601 A1 | 7/2005 |
| WO | WO 2012/014429 A1 | 2/2012 |

OPTICAL INFORMATION RECORDING MEDIUM AND RECORDING/REPRODUCING DEVICE

TECHNICAL FIELD

The present invention relates to an optical information recording medium such as an optical disc and to a recording/reproducing device, more particularly to an optical information recording medium including a super-resolution functional layer.

BACKGROUND ART

An optical disc such as a CD (Compact Disc), DVD (Digital Versatile Disc), or BD (Blu-ray Disc; registered trademark) is an optical information recording medium used for recording video data, audio data, or other information by irradiation with laser light and for reproducing the recorded information. Optical discs have increased in capacity through successive generations. For example, CDs achieve a 650 MB capacity with an approximately 1.2-mm thick light transmitting disc substrate layer, laser light having a wavelength of approximately 780 nm, and an objective lens having a numerical aperture (NA) of 0.45. After CDs came the generation of DVDs, which achieve a 4.7 GB capacity with an approximately 0.6-mm thick light transmitting disc substrate layer, laser light having a wavelength of approximately 650 nm, and an NA of 0.6. DVDs have, for example, a structure about 1.2 mm thick, with two disc substrates about 0.6-mm thick bonded together.

The standards for BDs, which have even higher recording densities, specify a protective (light transmitting) layer approximately 0.1 mm thick covering the information recording surface, laser light having a wavelength of approximately 405 nm, and a 0.85 NA. The capacities achieved are 25 GB for a single-layer BD having a single information recording surface, and 50 GB for a dual-layer disc having two information recording surfaces, enabling high-definition High-Vision video to be recorded in a BD over an extended time period.

It is anticipated that general users will be dealing with greatly increased amounts of data in next-generation high-definition video with higher resolution than High-Vision video, and in three-dimensional video, etc., so large capacity optical disc systems capable of storing larger amounts of data, exceeding the capacities of BDs, are being sought.

The above-described increasing capacities of optical discs have been achieved by shortening the wavelength of laser light and increasing the NA of an objective lens, thereby reducing both the size of the light spot focused on the focal plane of the objective lens and the size of the marks recorded on the tracks in the recording layer. In reducing the size of the focused spot, however, there is a physical limit defined by the optical characteristics of an objective lens and the wavelength of laser light. Specifically, the size limit of a reproducible recorded mark is said to be the diffraction limit $\lambda/(4NA)$ determined by the wavelength $\lambda$ of laser light and the NA of an objective lens.

In recent years, optical discs (referred to below as super-resolution optical discs) having a super-resolution functional layer with an optical characteristic (such as an optical absorption characteristic or optical transmission characteristic) that varies nonlinearly according to the intensity of the laser light are attracting attention as a way of achieving high-density recording and reproduction beyond the physical limits. When this super-resolution functional layer is irradiated with a focused spot of laser light, the refractive index or another optical characteristic changes in a local area of high light intensity or high temperature within the irradiated spot, and the diameter of the focused spot is reduced by this local area (referred to below as an aperture). This makes it possible to reproduce information from tiny recorded marks smaller than the $\lambda/(4NA)$ diffraction limit by using recording/reproducing devices with conventional BD optical heads. By use of a super-resolution optical disc, accordingly, recording and reproducing data at recording densities higher than the BD recording density can be achieved even with, for example, a recording and reproducing device using laser light with a wavelength of 405 nm and an objective lens with a 0.85 NA.

There is a demand, however, for super-resolution optical discs with still higher recording densities and greater capacities. It would therefore be desirable to select better materials for use in the super-resolution functional layers of super-resolution optical discs, and to optimize the layer structure and recording marks of super-resolution optical discs.

Japanese Patent No. 3866016 (patent reference 1), Japanese Patent Application Publication No. 2007-506219 (Japanese translation of PCT patent application, patent reference 2), and Japanese Patent Application Publication No. 2009-37698 may be cited as prior art references related to super-resolution optical discs. A method of measuring the optical characteristics of a super-resolution optical disc is disclosed in non-patent reference 1, listed below.

Optical discs having a super-resolution structure are disclosed in patent references 1 and 2. The pit depths of the super-resolution pits (non-flat optical recording marks smaller than the diffraction limit) in these optical discs are made shallower than the pit depths of non-super-resolution pits (non-flat optical recording marks larger than the diffraction limit). The modulation amount of the reproduced signal can thereby be increased.

An optical information recording medium having a super-resolution layer is disclosed in patent reference 3. In order to secure adequate reproduction performance with reduced thermal load on the medium, all of the pit depths in this optical information recording medium are restricted to the range from $\lambda/(10n)$ to $\lambda/(6n)$. Here, $\lambda$ indicates the wavelength of the laser light and n indicates the refractive index of the substrate through which the laser light passes.

PRIOR ART REFERENCES

Patent References

Patent reference 1: Japanese Patent No. 3866016
Patent reference 2: Japanese Translation of PCT Patent Application, Japanese Patent Application Publication No. 2007-506219
Patent reference 3: Japanese Patent Application Publication No. 2009-37698 (paragraphs 0010-0012 etc.)

Non-Patent Reference

Non-patent reference 1: Shuichi Ohkubo et al., "Temperature dependence of optical constants for InSb films including molten phases", Applied Physics Letters 92, 011919 (2008).

SUMMARY OF THE INVENTION

Problems to be Solved by the Invention

In a super-resolution optical disc, it would be desirable to maximize the intensity or amplitude of the reproduced signal obtained from recording marks smaller than the diffraction limit. The conditions placed on the pits disclosed in patent references 1-3, however, relate to optical characteristics such as the reflectance, transmittance, and phase characteristics of the super-resolution structure or the super-resolution layer, and only limited settings of conditions on combinations of these optical characteristics are shown. To widen the range of selectable conditions for super-resolution optical disc structures, there is a need to find other favorable setting conditions that increase the amplitude of the reproduced signal.

The present invention addresses the above problem with the object of providing an optical information recording medium having a structure capable of optimizing the amplitude of the reproduced signal obtained from super-resolution pits, and a recording/reproducing device that records information data on the above optical information recording medium and reproduces information from the above optical information recording medium.

Means for Solving the Problem

An optical information recording medium according to one aspect of the invention has a recording layer in which at least one recording mark is formed, a super-resolution functional layer that, when irradiated by a laser beam focused by a focusing optical system, enables information to be reproduced from a recording mark having a length shorter than the diffraction limit determined by the optical performance of the focusing optical system and the wavelength of the laser beam, and a protective layer that covers the recording layer and the super-resolution functional layer and transmits the laser beam. Letting n be the refractive index of the protective layer with respect to the laser beam, $\lambda$ be the wavelength of the laser beam, and $d_s$ be the depth of the recording mark, when irradiated by the focused laser beam, the super-resolution functional layer forms a focused light spot on the recording layer, the focused light spot including central light that irradiates the recording mark and peripheral light that irradiates a region outside the central light. The central light has a positive phase difference with respect to the peripheral light and the condition $d_s > \lambda/4n$ is satisfied.

An optical information recording medium according to another aspect of the invention has a recording layer in which at least one recording mark is formed, a super-resolution functional layer that, when irradiated by a laser beam focused by a focusing optical system, enables information to be reproduced from a recording mark having a length shorter than the diffraction limit determined by the optical performance of the focusing optical system and the wavelength of the laser beam, and a protective layer that covers the recording layer and the super-resolution functional layer and transmits the laser beam. Letting n be the refractive index of the protective layer with respect to the laser beam, $\lambda$ be the wavelength of the laser beam, and $d_s$ be the depth of the recording mark, when irradiated by the focused laser beam, the super-resolution functional layer forms a focused light spot on the recording layer, the focused light spot including central light that irradiates the recording mark and peripheral light that irradiates a region outside the central light. The central light has a negative phase difference with respect to the peripheral light and the condition $d_s < \lambda/4n$ is satisfied.

An optical information recording medium according to yet another aspect of the invention has a recording layer in which at least one recording mark is formed, a super-resolution functional layer that, when irradiated by a laser beam focused by a focusing optical system, enables information to be reproduced from a recording mark having a length shorter than the diffraction limit determined by the optical performance of the focusing optical system and the wavelength of the laser beam, and a protective layer that covers the recording layer and the super-resolution functional layer and transmits the laser beam. Letting n be the refractive index of the protective layer with respect to the laser beam, $\lambda$ be the wavelength of the laser beam, and $d_s$ be the depth of the recording mark, the super-resolution functional layer is configured to form both a first type of peak and a second type of peak when the depth $d_s$ of the recording mark having a length shorter than the diffraction limit is within the range from 0 to $\lambda/2n$, the first type of peak being a maximum of the reproduced signal amplitude, the second type of peak being a local maximum at which the reproduced signal amplitude is less than at the first type of peak.

A recording/reproducing device according to still another aspect of the invention records information data on or reproduces information data from an optical information recording medium having a recording layer in which at least one recording mark is formed, a super-resolution functional layer that, when irradiated by an irradiating laser beam focused by a focusing optical system of an optical head, enables information to be reproduced from a recording mark having a length shorter than the diffraction limit determined by the optical performance of the focusing optical system and the wavelength of the irradiating laser beam, and a protective layer that covers the recording layer and the super-resolution functional layer and transmits the laser beam. The recording/reproducing device has an optical head for irradiating the optical information recording medium with the irradiating laser beam and detecting a returning laser beam from the optical information recording medium, a laser driving unit for driving the optical head and controlling the irradiation intensity of the irradiating laser beam when information data are recorded on the optical information recording medium, a disc type determination unit for determining the type of the optical information recording medium, a setting information storage unit for holding setting information concerning the irradiation intensity of the irradiating laser beam, the setting information being based on the phase difference between central light in a focused spot formed on the recording layer by the irradiating laser beam when the super-resolution functional layer is irradiated by the irradiating laser beam and peripheral light that irradiates a region outside the central light, and on the ratio of the reflectance of the central light to the reflectance of the peripheral light that irradiates the region outside the central light, and a laser irradiation intensity setting unit for setting the irradiation intensity of the laser beam by selecting the irradiation intensity of the irradiating laser beam from among the setting information concerning the irradiation intensity of the irradiating laser beam held in the setting information storage unit on a basis of disc type information determined by the disc type determination unit, and sending the setting information concerning the selected irradiation intensity to the laser driving unit.

Effects of the Invention

An optical information recording medium embodying the present invention can achieve high-density recording and improved reproduced signal quality because it has a structure capable of optimizing the amplitude of the reproduced signal obtained from super-resolution pits.

A recording/reproducing device embodying the present invention can achieve high-density recording on the above optical information recording medium and can improve the quality of the signal reproduced from the above optical information recording medium.

MODE FOR CARRYING OUT THE INVENTION

First Embodiment

Figure 1:
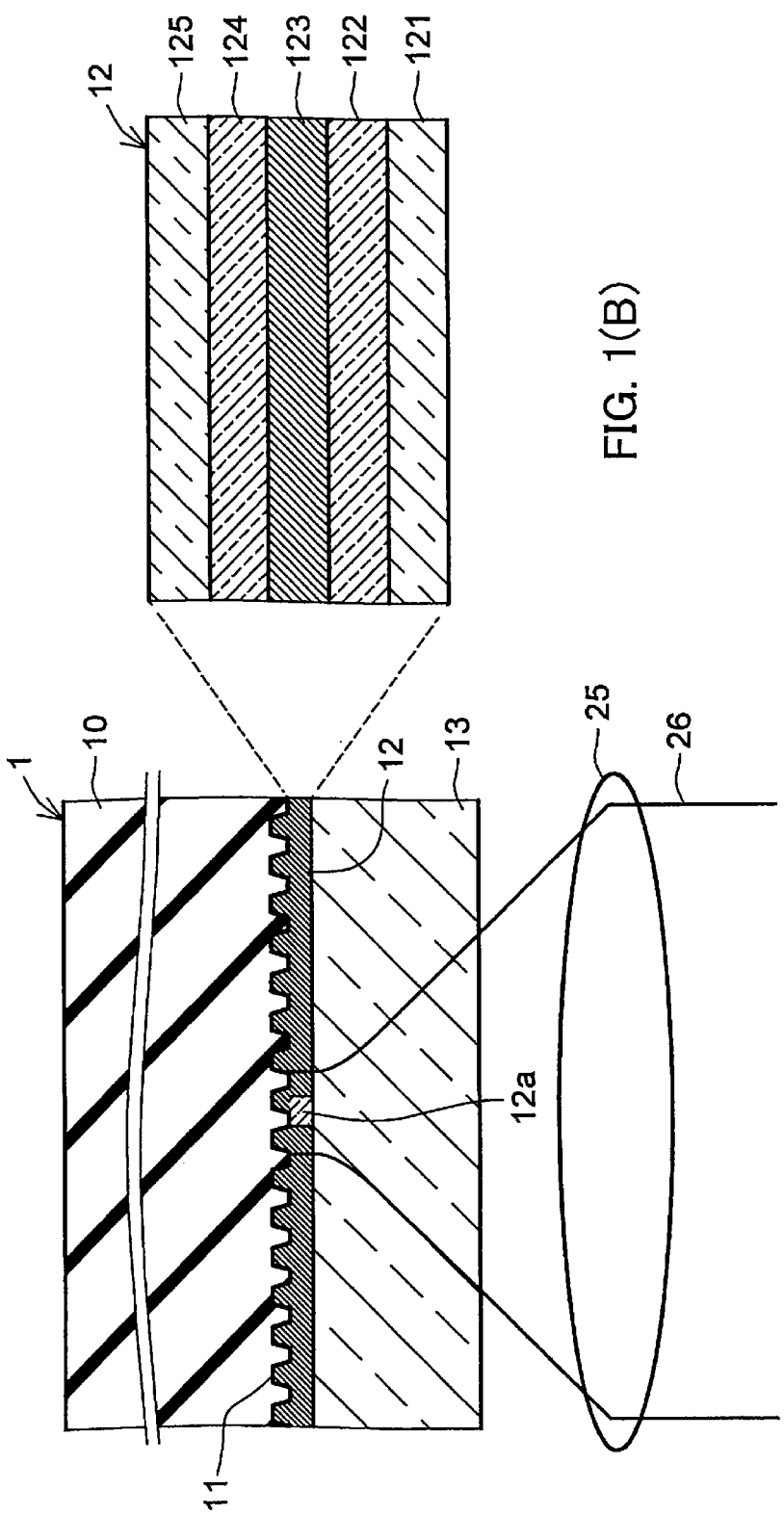
FIG. 1(A) is a schematic sectional diagram showing an example of the structure of an optical information recording medium according to a first embodiment of the invention.
FIG. 1(B) is a schematic sectional diagram showing an example of the super-resolution functional layer in the optical information recording medium.

FIG. 1(A) is a schematic sectional diagram showing an example of the structure of an optical information recording medium 1 according to a first embodiment of the invention. The optical information recording medium 1 is an example of a super-resolution optical disc of the reproduction-only (Read-Only) type. As shown in FIG. 1(A), the optical information recording medium 1 includes a substrate 10, a recording layer 11 formed on the substrate 10 (on the lower surface of the substrate 10 in FIG. 1(A)), a super-resolution functional layer 12 formed on the recording layer 11 (on the lower surface of the recording layer 11 in FIG. 1(A)), and a protective layer 13 formed on the super-resolution functional layer 12 (on the lower surface of the super-resolution functional layer 12 in FIG. 1(A)) so as to cover the recording layer 11 and super-resolution functional layer 12.

The substrate 10 comprises a material such as, for example, polycarbonate or glass. The protective layer 13 comprises a transparent material that transmits a laser beam 26 focused by a focusing optical system 25, such as an objective lens of an optical head, that is, an optical pickup (the optical pickup 40 shown in FIG. 7, described later) of a recording/reproducing device. The protective layer 13 is formed, for example, by bonding a thin light-transmitting plastic sheet to the super-resolution functional layer 12 by use of a transparent bonding layer, or by applying an ultraviolet curing resin to the super-resolution functional layer 12 by a spin coating method and curing it by ultraviolet irradiation.

Recessed recording marks, or pits, are formed on the surface of the light incidence side of the recording layer 11 (the lower surface of the recording layer 11 in FIG. 1(A)). The recording layer 11 is configured with, for example, a fine relief pattern of pit trains and/or grooves formed by embossing and a reflecting film of aluminum or the like formed on the relief pattern. The recording mark pits also include pits (super-resolution pits) with a size smaller than the diffraction limit $\lambda/(4NA)$ determined by the NA (numerical aperture) of the focusing optical system 25 and the wavelength $\lambda$ of the laser beam 26.

The super-resolution functional layer 12 generates a super-resolution phenomenon when irradiated by the laser beam 26, thereby enabling reproduction (also referred to below as 'super-resolution reproduction') of information by a reproducing device (an optical disc player) from recording marks smaller than the diffraction limit determined by the optical performance of the focusing optical system 25 and the wavelength $\lambda$ of the laser beam 26. The super-resolution functional layer 12 is formed adjacent to the recording layer 11 and intervenes between the recording layer 11 and protective layer 13. The super-resolution functional layer 12 has a property (e.g., a nonlinear optical absorption characteristic or a nonlinear optical characteristic) such that its refractive index and other optical characteristics change while it is irradiated with a focused light spot of the laser beam 26 transmitted through the protective layer 13. When the super-resolution functional layer 12 is irradiated by the focused light spot of the laser beam 26, a local region with altered optical characteristics, that is, an optical aperture 12a, is formed. Owing to this optical aperture 12a, the diameter of the focused light spot on the recording layer 11 is reduced, so recording marks having sizes smaller than the diffraction limit can be detected with high resolution, enabling information to be reproduced from the recording marks.

FIG. 1(B) is a schematic sectional diagram showing an example of the structure of the super-resolution functional layer 12 of the optical information recording medium 1. As shown in FIG. 1(B), the super-resolution functional layer 12 includes, for example, a dielectric layer 121, an interference layer 122, a nonlinear material layer 123, an interference layer 124, and a dielectric layer 125, and is configured as a stack of these layers 121-125. When the nonlinear material layer 123 undergoes irradiation by the focused laser beam 26, changes occur in its optical characteristics due to phenomena such as light absorption heating and/or electron excitation, and a refractive index change occurs in a local region within the focused light spot. This change in the refractive index in a local region causes changes in the reflectance and phase of light in that region. In this application, a local region undergoing such a refractive index change within a focused light spot will be referred to as 'an aperture' or 'an optical aperture'.

The constituent material of the nonlinear material layer 123 is not particularly limited, so long as it can form an optical aperture 12a. At least one of a Ge—Sb—Te-based material, an Ag—In—Sb—Te-based material, an Sb—Te-based material, and an In—Sb-based material, for example, may be used as the constituent material. Alternatively, the nonlinear material layer 123 may be made of a metal oxide material such as ZnO.

The optical characteristics of the super-resolution functional layer 12 as a whole are determined by the superposition of multiply internally reflected light in the multilayer film structure consisting of the dielectric layer 121, interference layer 122, nonlinear material layer 123, interference layer 124, and dielectric layer 125. The reflectance of the super-resolution functional layer 12 and the amount of phase change of the light are determined by this superposition of multiply internally reflected light.

The configuration of the super-resolution functional layer 12 is not limited to the internal structure shown in FIG. 1(B). For example, the super-resolution functional layer 12 need not necessarily include all of the dielectric layer 121, interference layer 122, interference layer 124, and dielectric layer 125 shown in FIG. 1(B); some of these layers may be omitted if necessary. Conversely, layers other than the dielectric layer 121, interference layer 122, interference layer 124, and dielectric layer 125 may be added if necessary.

For an optical information recording medium with a super-resolution reproduction mechanism, as the triggering mode of the super-resolution phenomenon, there is the heat mode disclosed in patent reference 1 (which causes the optical characteristics to change by holding the temperature at or above a fixed value in the beam spot irradiation region in the super-resolution functional layer 12), or the photon mode (which causes the optical characteristics to change by holding the quantity of photons at or above a fixed value in the beam spot irradiation region in the super-resolution functional layer 12). There are also modes of triggering the super-resolution phenomenon in an optical information recording medium with a super-resolution reproduction mechanism that cause hardly any reflectance change in the super-resolution functional layer due to a change in temperature or amount of light at the reproducing light power, as disclosed in patent reference 1.

Various types of constituent materials and film structures can be considered for the super-resolution functional layer 12. The optical information recording medium 1 according to the first embodiment need only have a structure in which the super-resolution functional layer 12 produces a difference in optical characteristics between the optical aperture 12a and its periphery and thereby enables information to be reproduced from tiny recording marks smaller than the diffraction limit. As described later, even an optical information recording medium 1 with this type of structure may be an optical information recording medium 1 having a super-resolution functional layer that hardly gives rise to any reflectance change at the reproducing light power and does not utilize reflectance changes due to changes in temperature or amount of light.

The optical characteristics in the optical aperture 12a and its periphery reduce to optical parameters such as reflectance and phase. These optical parameters of the optical aperture 12a are determined, by calculation or experiment, from the optical characteristics in the high temperature state present during super-resolution reproduction; the optical parameters in the peripheral part are determined, by calculation or experiment, from the optical characteristics in the comparatively low temperature state present before the high temperature state present during super-resolution reproduction is reached. This embodiment will be described below using two parameters: the phase difference $\Delta \phi$ between the reflected light in the optical aperture 12a and the reflected light in the periphery around the optical aperture 12a; and the ratio $R_{sr}/R_{nr}$ of the reflectance $R_{sr}$ in the optical aperture 12a to the reflectance $R_{nr}$ in the periphery around the optical aperture 12a. Here, the phase difference $\Delta \phi$ is the phase difference of the reflected light in the optical aperture 12a with respect to the reflected light in the periphery around the optical aperture 12a.

Figure 2:
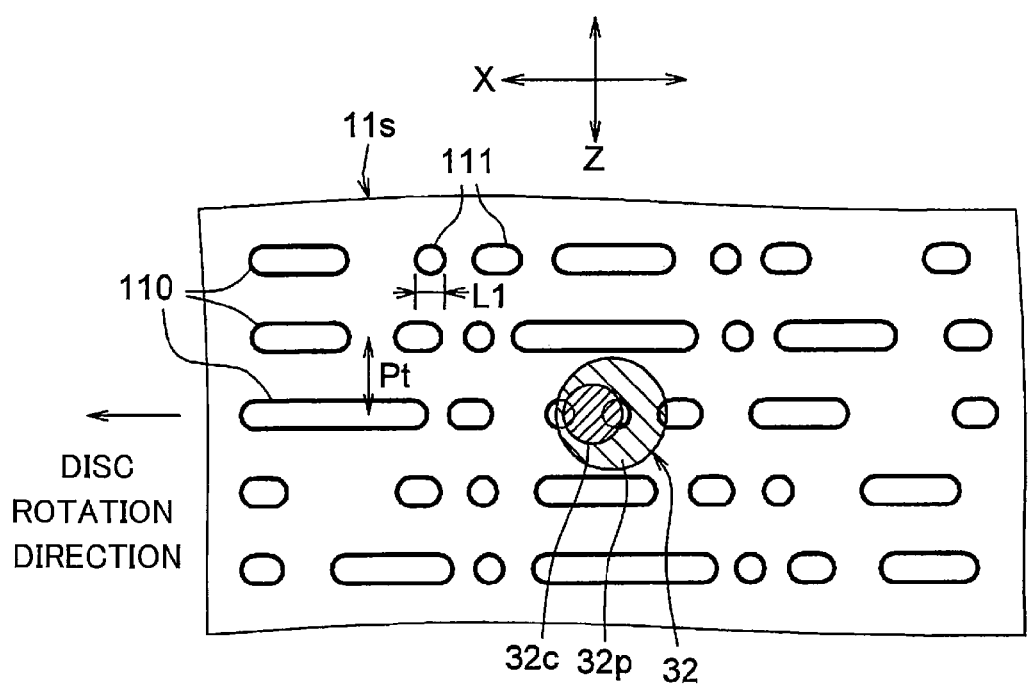
FIG. 2 is a plan view schematically showing a group of information pits recorded in the recording layer of the optical information recording medium.

FIG. 2 is a plan view schematically showing a group of information pits recorded in the recording layer 11 of the optical information recording medium 1. The group of information pits includes super-resolution pits 111 having mark lengths shorter than the diffraction limit $\lambda/(4NA)$ and non-super-resolution pits 110 having mark lengths longer than the diffraction limit $\lambda/(4NA)$; the super-resolution pits 111 and non-super-resolution pits 110 are arrayed along an information track oriented in the tangential direction (X-axis direction) of the optical information recording medium 1. The information track extends in the direction perpendicular to the radial direction (Z-axis direction) of the optical information recording medium 1 or optical disc.

FIG. 2 also schematically shows a focused spot 32 formed in the recording layer 11. The focused spot 32 includes central light 32c irradiating the information track and peripheral light 32p irradiating a region outside it. The central light 32c is local light generated in the optical aperture 12a, the optical characteristics of which are locally altered in the super-resolution functional layer 12. The peripheral light 32p is light generated in a region (a region peripheral to the optical aperture 12a) with different optical characteristics from the optical aperture 12a.

The following is a description of results obtained by simulating the pit depth dependency of the amplitude of the reproduced signal obtained from the super-resolution pits 111. From the results obtained by this simulation, the inventors found conditions, for the settings of the optical characteristics of the super-resolution functional layer 12 and the pit depth, under which the amplitude of the reproduced signal obtained from the super-resolution pits 111 could be increased. Setting conditions like these are not disclosed in the above patent references 1-3.

Figure 3:
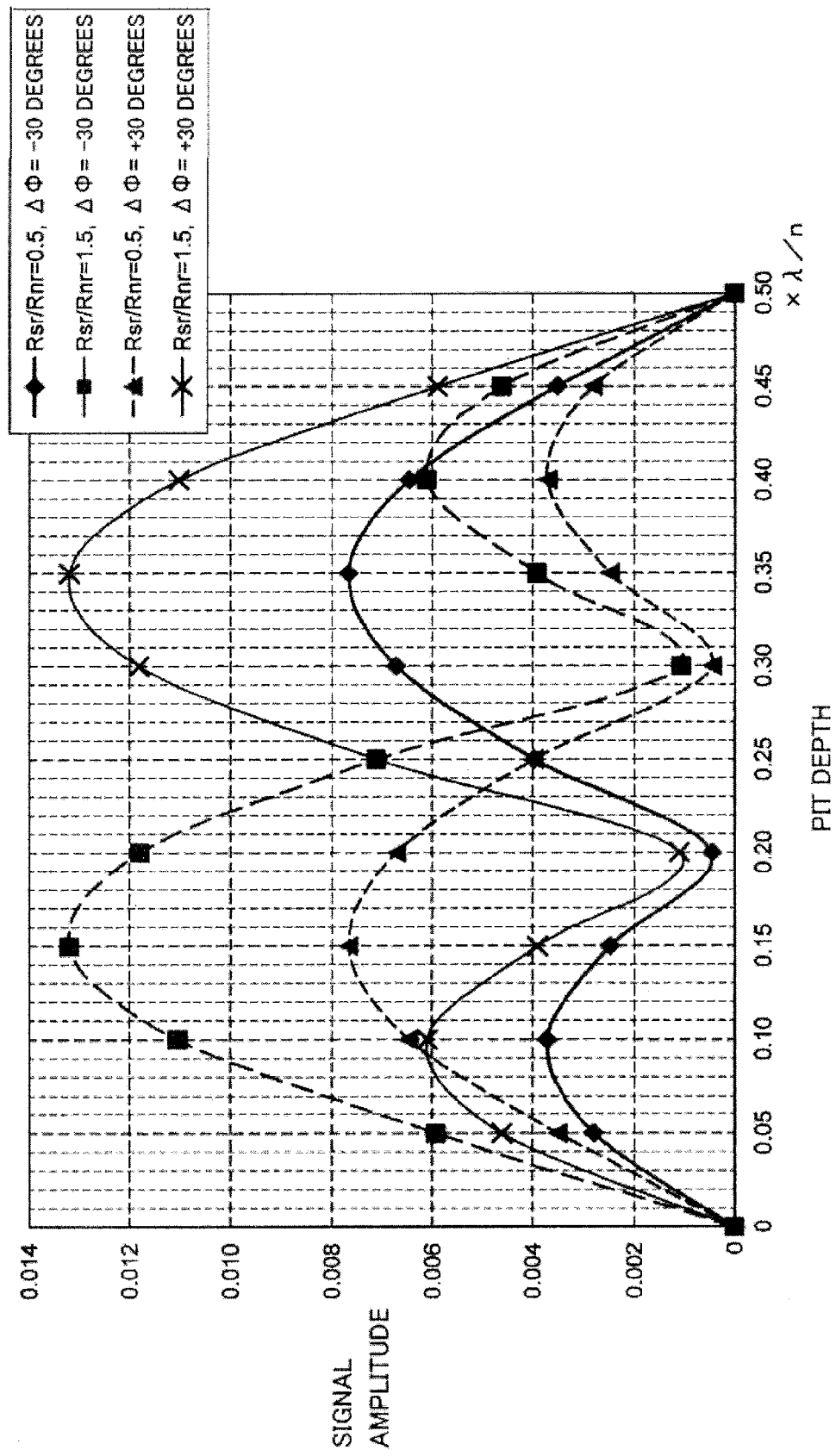
FIG. 3 is a graph showing changes, with respect to pit depth, in the amplitude of a signal reproduced from super-resolution pits.

FIG. 3 is a graph, obtained from the simulation, showing changes, with respect to pit depth, in the amplitude of a signal reproduced from super-resolution pits 111. In the graph in FIG. 3, the horizontal axis indicates the pit depth; the vertical axis indicates the normalized reproduced signal amplitude. In this simulation, pits with a mark length L1 of 75 nm were used as the super-resolution pits 111, and a laser beam with a wavelength of 405 nm was used. When the super-resolution phenomenon occurs, the reflectance changes sharply at the boundary between the region of the central light 32c and the region of the peripheral light 32p in FIG. 2.

Results when the ratio (reflectance ratio) $R_{sr}/R_{nr}$ of the reflectance $R_{sr}$ in the optical aperture 12a to the reflectance $R_{nr}$ in the periphery around the optical aperture 12a is 1±0.5 and the phase difference $\Delta \phi$ between the reflected light (central light 32c) in the optical aperture 12a and the reflective light (peripheral light 32p) in the periphery around the optical aperture 12a is ±30 degrees are shown in FIG. 3. These reflectances $R_{sr}$ and $R_{nr}$ are optical amplitude reflectances. The light power (optical power) of the reflected light in the optical aperture 12a is proportional to the square of reflectance $R_{sr}$; the light power (optical power) of the reflected light in the periphery around the optical aperture 12a is proportional to the square of reflectance $R_{nr}$.

From the result in FIG. 3, it can be seen that the pit depth at which the reproduced signal amplitude obtained from the super-resolution pits 111 forms its maximum peak differs according to the settings of the optical characteristics (the reflectance ratio $R_{sr}/R_{nr}$ and phase difference $\Delta \phi$) of the super-resolution functional layer 12. In general, in BDs, DVDs, and other conventional types of optical discs that do not use the super-resolution effect, the pit depth at which the reproduced signal amplitude is theoretically maximized is $\lambda/(4n)$. Here, $\lambda$ indicates the wavelength of the laser beam and n indicates the refractive index of the protective layer 13. In reproduction from super-resolution pits 111, however, taking the $\lambda/(4n)$ pit depth at which the reproduced signal amplitude is theoretically maximized in conventional optical discs as a reference, there are cases in which the maximum peak is formed on the shallow side of the $\lambda/(4n)$ pit depth and cases in which the maximum peak occurs on the deep side of the $\lambda/(4n)$ pit depth. There is also a local maximum peak with a value smaller than the value of the maximum peak, located at a position that is symmetric to the pit depth at which the maximum peak occurs, with respect to the $\lambda/(4n)$ pit depth. When the pit depth is set at the $\lambda/(4n)$ value that maximizes the reproduced signal amplitude in the above conventional optical discs, accordingly, it is difficult to maximize or increase the reproduced signal amplitude obtained from super-resolution pits 111.

In this application, the maximum peak and the local maximum peak of the reproduced signal amplitude that occur at each setting of the optical characteristics of the super-resolution functional layer 12 will be respectively referred to as a first type of peak and a second type of peak.

In FIG. 3, there are two conditions on the optical characteristics (optical characteristic conditions (a) and (b)) under which the maximum peak (the first type of peak) is formed on the shallower side:

(a) when the reflectance ratio $R_{sr}/R_{nr}=1+0.5$ and the phase difference $\Delta\phi=-30$ degrees; and (b) when the reflectance ratio $R_{sr}/R_{nr}=1-0.5$ and the phase difference $\Delta\phi=+30$ degrees.

Either of these optical characteristic conditions (a) and (b) could be described as representing conditions described in patent references 1-3 under which the maximum peak of the reproduced signal obtained from super-resolution pits is formed when the pit depth is shallower than $\lambda/(4n)$.

In FIG. 3, however, there also two conditions on the optical characteristics under which the maximum peak (the first type of peak) is formed on the deeper side (optical characteristic conditions (c) and (d)):

(c) when the reflectance ratio $R_{sr}/R_{nr}=1+0.5$ and the phase difference $\Delta\phi=+30$ degrees; and (d) when the reflectance ratio $R_{sr}/R_{nr}=1-0.5$ and the phase difference $\Delta\phi=-30$ degrees.

The result that the reproduced signal intensity obtained from the super-resolution pits 111 forms a maximum peak on the side deeper than $\lambda/(4n)$ was not disclosed in patent references 1-3. As well as conditions for pit depths shallower than $\lambda/(6n)$, there are also conditions under which a maximum peak can be obtained on the side deeper than a pit depth of $\lambda/(6n)$.

The magnitudes of the reflectance ratio $R_{sr}/R_{nr}$ and phase difference $\Delta\phi$ are not limited to the values in FIG. 3; results of simulations performed by further altering the reflectance ratio $R_{sr}/R_{nr}$ and phase difference $\Delta\phi$ showed the same tendencies as in FIG. 3.

For each set of optical characteristic conditions concerning the above reflectance ratio $R_{sr}/R_{nr}$ and phase difference $\Delta\phi$, pit depth conditions that yield a reproduced signal amplitude greater than the reproduced signal amplitude at the reference pit depth $\lambda/(4n)$ can be described as preferable pit depth conditions for the optical information recording medium 1 in the first embodiment. Such pit depths are present at pit depths corresponding to the first type of peak. A 'pit depth corresponding to the first type of peak' is a range including (pit depth corresponding to the first type of peak)±(manufacturing tolerance), that is, a range in the vicinity of the pit depth corresponding to the first type of peak. Here the second type of peak is smaller than the reproduced signal amplitude at a pit depth of $\lambda/(4n)$, so it does not fulfil the preferable pit depth condition for the optical information recording medium 1 in the first embodiment.

The first type of peak will now be discussed. From FIG. 3, under either of optical characteristic conditions (a) and (b), the reproduced signal amplitude obtained from the super-resolution pits 111 can be increased by restricting the preferred pit depth $d_s$ for the optical information recording medium 1 in the first embodiment to a range of values equal to or greater than $\lambda/(16.7n)$ but less than $\lambda/(4n)$. In this case, the pit depth at which the reproduced signal amplitude attains the maximum peak is approximately $\lambda/(6.25n)$.

Under either of optical characteristic conditions (c) and (d), the reproduced signal amplitude obtained from the super-resolution pits 111 can be increased by restricting the preferred pit depth $d_s$ for the optical information recording medium 1 in the first embodiment to a range of values greater than $\lambda/(4n)$ but equal to or less than $\lambda/(2.27n)$. The pit depth at which the reproduced signal amplitude attains its maximum peak is now approximately $\lambda/(2.89n)$.

Furthermore, by setting the pit depth $d_s$ to values in the ranges described below, it is possible to obtain 80% or more of the value of the maximum peak of the reproduced signal amplitude. That is, under either of optical characteristic conditions (a) and (b), it is desirable to restrict the pit depth $d_s$ to the range of values equal to or greater than $\lambda/(10.5n)$ and equal to or less than $\lambda/(4.6n)$. Under either of the optical characteristic conditions (c) and (d), it is desirable to restrict the pit depth $d_s$ to the range of values equal to or greater than $\lambda/(3.56n)$ and equal to or less than $\lambda/(2.46n)$. That is, under either of optical characteristic conditions (a) and (b), expression (1) is preferably satisfied, and under either of optical characteristic conditions (c) and (d), mathematical expression (2) is preferably satisfied.

$$\lambda/(10.5n) \leq d_s \leq \lambda/(4.6n) \qquad (1)$$

$$\lambda/(3.56n) \leq d_s \leq \lambda/(2.46n) \qquad (2)$$

When a data sequence configured from a mixture of non-super-resolution pits 110 and super-resolution pits 111 is recorded on the optical information recording medium 1 according to the first embodiment, if a pit depth distant from the vicinity of $\lambda/(4n)$ on the shallower side or the deeper side is selected, the reproduced signal amplitude obtained from the non-super-resolution pits 110 is reduced from its maximum peak. It would therefore be desirable to increase the reproduced signal amplitude obtained from non-super-resolution pits 110 as much as possible. From the standpoint of total reproduced signal quality, it would be desirable to bring the pit depth as close as possible to the $\lambda/(4n)$ value at which the reproduced signal amplitude obtained from non-super-resolution pits 110 attains its maximum peak.

For the above reasons, under either of optical characteristic conditions (a) and (b), it is desirable to limit the pit depth $d_3$ to the range of values equal to or greater than $\lambda/(6.25n)$ but less than $\lambda/(4n)$. Under either of optical characteristic conditions (c) and (d), it is desirable to limit the pit depth $d_s$ to the range of values greater than $\lambda/(4n)$ but equal to or less than $\lambda/(2.89n)$.

If the pit depth range from $\lambda/(10n)$ to $\lambda/(6n)$ disclosed in patent references 1-3 is disregarded, then under either of optical characteristic conditions (a) and (b), it is desirable to limit the pit depth $d_s$ to the range of values equal to or greater than $\lambda/(16.7n)$ but less than $\lambda/(4n)$, which enables a reproduced signal amplitude greater than the reproduced signal amplitude at a pit depth of $\lambda/(4n)$ to be obtained. It is also desirable to limit the pit depth $d_s$ to the range of values equal to or greater than $\lambda/(6n)$ but equal to or less than $\lambda/(4.6n)$; in this case, a reproduced signal amplitude equal to 80% or more of the maximum peak amplitude can be secured. Even in this case, the reproduced signal amplitude obtained from the super-resolution pits 111 can still be increased.

As described above, by selecting a pit depth in the vicinity of the first type of peak present on the curve of reproduced signal amplitude versus pit depth under each of the optical characteristic conditions for the super-resolution functional layer 12, the reproduced signal amplitude for super-resolution pits 111 can be increased above the value when the pit depth $\lambda/(4n)$ at which the reproduced signal amplitude is theoretically maximized on a conventional optical disc is selected.

As in the above optical characteristic conditions (a), (b), (c) and (d) regarding the first type of peak, the depth $d_s$ of super-resolution pits 111 and the depth of non-super-resolution pits 110 can be set on the basis of a combination of a first criterion, namely whether the polarity of the phase difference $\Delta\phi$ between the reflected light in the optical aperture 12a and the reflected light in the periphery around the optical aperture 12a is positive or negative, and a second criterion, namely whether the proportional change in the reflectance ratio $R_{sr}/R_{nr}$ which is an optical characteristic of the super-resolution functional layer 12 is larger or smaller than 1.

From the series of characteristics described above, there are further conditions under which the reproduced signal amplitude increases markedly, as follows.

The condition under which the maximum peak (the first type of peak) of the reproduced signal amplitude increases markedly on the shallow side (i.e., on the side with a pit depth less than $\lambda/(4n)$) is that the reflectance ratio $R_{sr}/R_{nr}$ is 1 or more and the polarity of the phase difference $\Delta\phi$ is negative (the first condition).

The condition under which the maximum peak (the first type of peak) of the reproduced signal amplitude increases markedly on the deep side (i.e., on the side with a pit depth greater than $\lambda/(4n)$) is that the reflectance ratio $R_{sr}/R_{nr}$ is 1 or more and the polarity of the phase difference $\Delta\phi$ is positive (the second condition).

Therefore, by setting one of the conditions under which the reproduced signal amplitude increases markedly, that is, by setting the first condition or second condition described above, good reproduced signal quality can be obtained in reproduction by the reproducing device.

This enables the pit depth $d_s$ at which the reproduced signal amplitude obtained from super-resolution pits 111 increases to be set according to a combination of the size of the reflectance ratio $R_{sr}/R_{nr}$ and the polarity of the phase difference $\Delta\phi$, which are optical characteristics of the super-resolution functional layer 12. Conversely, the material and film structure of the super-resolution functional layer 12 may be chosen to achieve a desirable combination of the reflectance ratio $R_{sr}/R_{nr}$ and the polarity of the phase difference $\Delta\phi$ of the super-resolution functional layer 12.

The reflectance and phase of the super-resolution functional layer 12 can be determined if the complex refractive indexes ($=n+i\cdot k$) of its constituent materials and the film thicknesses indicating the parameters of the film structure are known. Here, n is a refractive index, k is an extinction coefficient, and i is the square root of $-1$. The reflectance and phase of the super-resolution functional layer 12 can be determined experimentally by using test samples in which the super-resolution functional layer 12 is actually deposited on a substrate by a method such as sputtering. A method of measuring the optical characteristics of this type of super-resolution functional layer 12 is disclosed in, for example, non-patent reference 1.

Next, an optical information recording medium 1 having a super-resolution functional layer 12 of a type that creates substantially no difference in reflectance between the optical aperture 12a and its periphery will be described. This type of super-resolution functional layer 12 experiences little change in reflectance with respect to reproduced light power, and the reflectance change caused by a change in temperature or amount of light is not utilized.

Figure 4:
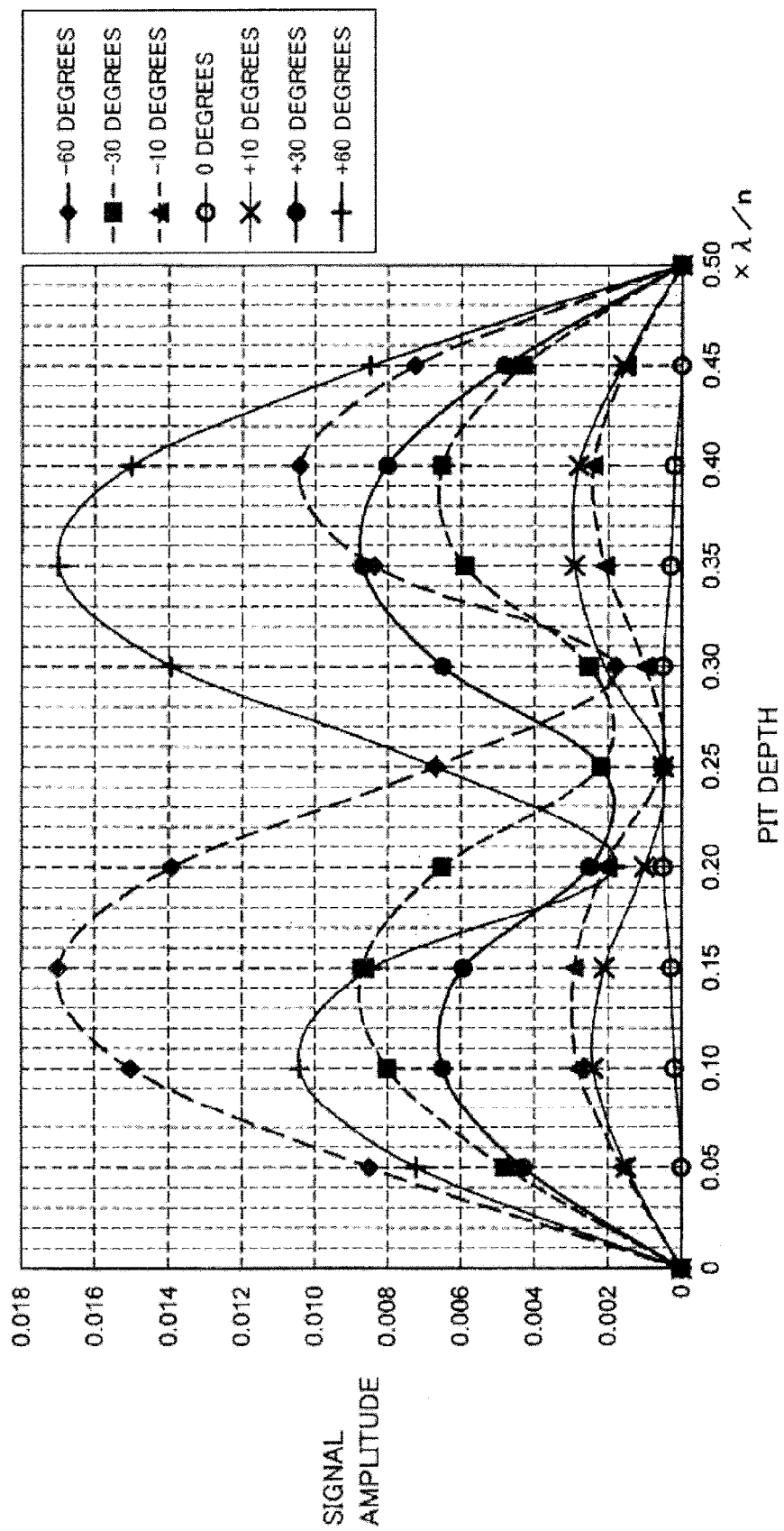
FIG. 4 is a graph showing changes in reproduced signal amplitude with respect to pit depth.

The relationship between the reproduced signal amplitude obtained from super-resolution pits 111 on an optical information recording medium 1 of this type and the pit depth $d_s$ was tested by simulation. FIG. 4 is a graph showing results of the simulation. In the graph in FIG. 4, the horizontal axis indicates the pit depth and the vertical axis indicates the normalized reproduced signal amplitude. In this simulation, pits having a mark length L1 of 75 nm were used as the super-resolution pits 111, and a laser beam with a wavelength of 405 nm was used. When the super-resolution phenomenon occurs the reflectance hardly changes at all at the boundary between the region of the central light 32c and the region of the peripheral light 32p. The lack of change in the reflectance itself between non-super-resolution reproduction carried out at a low reproducing light power and super-resolution reproduction carried out at high power may be attributable to the small difference between the reflectance in the optical aperture 12a and the reflectance in its periphery.

FIG. 4 shows the relationship between the reproduced signal amplitude obtained from super-resolution pits 111 and the pit depth $d_s$ when the reflectance ratio $R_{sr}/R_{nr}$ satisfies the condition $0.95 \leq R_{sr}/R_{nr} \leq 1.05$ and is thus substantially 1. Even with a super-resolution functional layer 12 of this type, exhibiting a very small reflectance change, a phase difference $\Delta\phi$ arises between the reflected light (central light) in the optical aperture 12a and the reflected light (peripheral light) in the periphery around the optical aperture 12a, so it will be appreciated that information can be reproduced even from super-resolution pits 111 with a size smaller than the diffraction limit.

According to the graph in FIG. 4, as in the graph in FIG. 3, as the pit depth varies, there are a maximum peak (a first type of peak) of the reproduced signal amplitude and a local maximum peak (a second type of peak) having a smaller value than the maximum peak.

The first type of peak will be discussed first. For a super-resolution functional layer 12 in which the polarity of the phase difference $\Delta\phi$ is negative, the reproduced signal amplitude can be increased by making the pit depth $d_s$ less than $\lambda/(4n)$. Conversely, for a super-resolution functional layer 12 in which the polarity of the phase difference $\Delta\phi$ is positive, the reproduced signal amplitude can be increased by making the pit depth $d_s$ greater than $\lambda/(4n)$.

In optical information recording media having a super-resolution functional layer 12 in which hardly any reflectance change occurs, the depth $d_s$ of the super-resolution pits 111 and the depth of the non-super-resolution pits 110 can be set as above on the basis of the criterion of whether the polarity of the phase difference $\Delta\phi$ between the reflected light (central light) in the optical aperture 12a and the reflected light (peripheral light) in the periphery around the optical aperture 12a is positive or negative.

Figure 5:
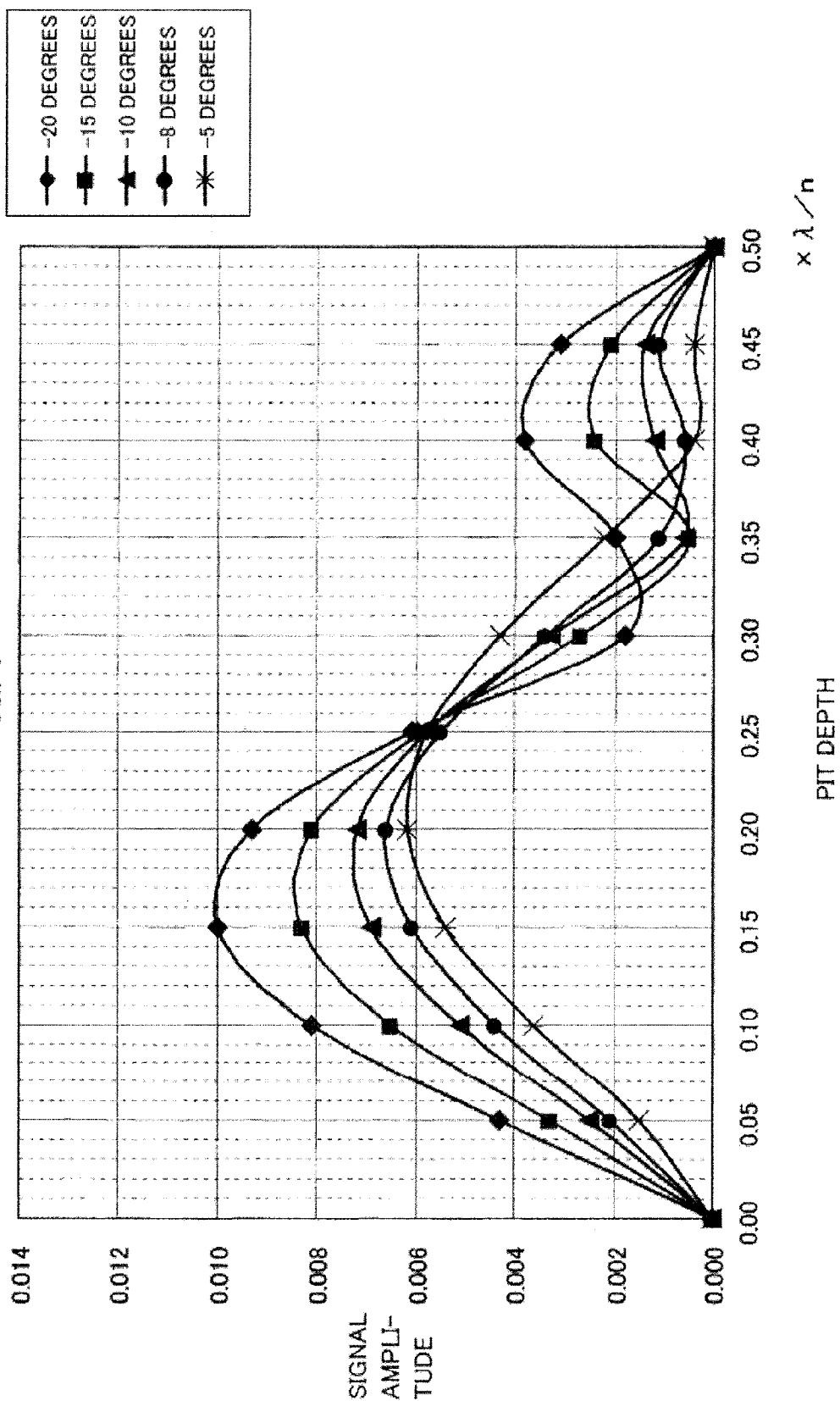
FIG. 5 is a graph showing changes in reproduced signal amplitude with respect to pit depth for various phase differences.

Characteristic curves distinctly having a first type of peak and a second type of peak at specific pit depths $d_s$ appear when the absolute phase difference value $|\Delta\phi|$ is 10 degrees or more. In order to gain a definite increasing effect on reproduced signal intensity or in order to enable a definite selection regarding a shallow or deep pit depth $d_s$, an absolute phase difference value $|\Delta\phi|$ of 10 degrees or more is desirable. As an example, FIG. 5 shows characteristic curves when the reflectance ratio $R_{sr}/R_{nr}=1.5$ and the phase difference $\Delta\phi$ is varied among 5 degrees, 8 degrees, 10 degrees, 15 degrees, and 20 degrees. A definite increasing effect on reproduced signal intensity can be obtained when the phase difference $\Delta\phi$ is 10 degrees or more.

For an optical information recording medium 1 having a super-resolution functional layer 12 of the type that creates substantially no difference in reflectance between the optical aperture 12a and its periphery, the reflectance ratio $R_{sr}/R_{nr}$ may be excluded from the optical characteristic conditions for determining the pit depth; only the phase difference $\Delta\phi$ need be considered in the optical characteristic conditions. For each phase difference $\Delta\phi$, pit depth conditions that yield a larger reproduced signal amplitude than the reproduced signal amplitude at the reference pit depth $\lambda/(4n)$ can be described as preferable pit depth conditions for the optical information recording medium 1 in the first embodiment. In general, the super-resolution functional layer 12 is preferably configured to generate, for recording marks having a length smaller than the diffraction limit and a depth $d_s$ in the range from 0 to $\lambda/(2n)$, both a first type of peak at which the reproduced signal amplitude is maximum and a second type of peak at which the reproduced signal amplitude has a local maximum with a value smaller than the value of the reproduced signal amplitude corresponding to the first type of peak.

Therefore, from FIG. 4, with a super-resolution functional layer 12 in which the polarity of the phase difference $\Delta\phi$ is negative, regarding the preferable pit depth $d_s$ of the optical information recording medium 1 in the first embodiment, the reproduced signal amplitude obtained from the super-resolution pits 111 can be increased by restricting their pit depth $d_s$ to the range of values equal to or greater than $\lambda/(25n)$ but less than $\lambda/(4n)$. In this case, the pit depth at which the reproduced signal amplitude attains its maximum peak is approximately $\lambda/(7n)$.

With a super-resolution functional layer 12 in which the polarity of the phase difference $\Delta\phi$ is positive, regarding the preferable pit depth $d_s$ of the optical information recording medium 1 in the first embodiment, the reproduced signal amplitude obtained from the super-resolution pits 111 can be increased by restricting their pit depth $d_s$ to the range of values greater than $\lambda/(4n)$ but equal to or less than $\lambda/(2.15n)$. In this case, the pit depth at which the reproduced signal amplitude attains its maximum peak is approximately $\lambda/(2.78n)$.

In addition, by setting the pit depth $d_s$ to values in the ranges described below, it is possible to obtain 80% or more of the maximum peak value of the reproduced signal amplitude. That is, when the polarity of the phase difference $\Delta\phi$ in the super-resolution functional layer 12 is negative, it is desirable to restrict the pit depth $d_s$ to the range of values equal to or greater than $\lambda/(11.2n)$ but equal to or less than $\lambda/(5.2n)$. When the polarity of the phase difference $\Delta\phi$ in the super-resolution functional layer 12 is positive, it is desirable to restrict the pit depth $d_s$ to the range of values equal to or greater than $\lambda/(3.22n)$ but equal to or less than $\lambda/(2.4n)$.

That is, with a super-resolution functional layer 12 in which the polarity of the phase difference $\Delta\phi$ is negative, expression (3) is preferably satisfied, and with a super-resolution functional layer 12 in which the polarity of the phase difference $\Delta\phi$ is positive, expression (4) is preferably satisfied.

$$\lambda/(11.2n) \leq d_s \leq \lambda/(5.2n) \tag{3}$$

$$\lambda/(3.22n) \leq d_s \leq \lambda/(2.4n) \tag{4}$$

Next, the second type of peak will be discussed. From FIG. 4, there are pit depth conditions with which a larger reproduced signal amplitude than the reproduced signal amplitude at the reference pit depth of $\lambda/(4n)$ can be obtained not only near the first type of peak but also near the second type of peak. Accordingly, a large reproduced signal amplitude can also be obtained by setting the recording mark depth $d_3$ to a pit depth at which the second type of peak occurs. Such pit depths exist at a pit depth corresponding to the second type of peak. The 'pit depth corresponding to the second type of peak' is a range including (pit depth corresponding to the second type of peak)±(manufacturing tolerance), that is, a range near the pit depth corresponding to the second type of peak.

Specifically, regarding the preferable pit depth $d_s$ of the optical information recording medium 1 in the first embodiment when the polarity of the phase difference $\Delta\phi$ in the super-resolution functional layer 12 is negative, the reproduced signal amplitude obtained from the super-resolution pits 111 can be increased by restricting the pit depth $d_s$ to the range of values equal to or greater than $\lambda/(22.2n)$ but less than $\lambda/(6.58n)$.

Regarding the preferable pit depth $d_s$ of the optical information recording medium 1 in the first embodiment when the polarity of the phase difference $\Delta\phi$ in the super-resolution functional layer 12 is positive, the reproduced signal amplitude obtained from the super-resolution pits 111 can be increased by restricting the pit depth $d_s$ to the range of values equal to or greater than $\lambda/(2.98n)$ but less than $\lambda/(2.2n)$.

In addition, by setting the pit depth to values in the ranges described below, it is possible to obtain 80% or more of the maximum peak value of the reproduced signal amplitude. That is, when the polarity of the phase difference $\Delta\phi$ in the super-resolution functional layer 12 is negative, it is desirable to restrict the pit depth $d_s$ to the range of values equal to or greater than $\lambda/(14.9n)$ but equal to or less than $\lambda/(6.6n)$. When the polarity of the phase difference $\Delta\phi$ in the super-resolution functional layer 12 is positive, it is desirable to restrict the pit depth $d_s$ to the range of values equal to or greater than $\lambda/(2.86n)$ but equal to or less than $\lambda/(2.3n)$.

To form pits on a master disc by photolithography, two types of photoresists with different sensitivities are deposited, one on the other, and exposed to light with an exposure intensity that is varied according to the pit depth $d_s$, thereby varying the depth of the exposed resist.

Pit depths $d_s$ for increasing the reproduced signal amplitude obtained from super-resolution pits 111 have been described above without any specific limitations on the pit depth of non-super-resolution pits 110. In information reproduction from non-super-resolution pits 110, compared with the pit detection effect through the optical aperture 12a, the reproducing mechanism that carries out detection in the entire focused spot 32 is dominant, as it is in conventional optical discs lacking a super-resolution reproducing mechanism. The reproduced signal obtained from the non-super-resolution pits 110 thus forms its maximum amplitude when the pit depth is substantially $\lambda/(4n)$, and the amplitude decreases as the pit depth changes from $\lambda/(4n)$ in the shallower direction and in the deeper direction.

When a capability to detect a push-pull signal by using light diffracted by the information track consisting of pit trains is provided, the SNR (signal-to-noise ratio) of the reproduced signal amplitude obtained from the non-super-resolution pits 110 and the amplitude of the push-pull signal are in a trade-off relationship. In view of this, the depth of the non-super-resolution pits 110 is preferably set to a value in the range from $\lambda/(7n)$ to $\lambda/(3n)$.

The simulations in FIGS. 3 and 4 were obtained with a mark length L1 of 75 nm and laser beam wavelength of 405 nm, but these values are not limiting so long as the relationship that the length of the recording mark is smaller than the diffraction limit determined by the numerical aperture of the objective lens and the wavelength of the laser beam holds true.

The pit depths at which the reproduced signal amplitudes obtained from super-resolution pits 111 and non-super-resolution pits 110 are maximized differ from each other as above, so the amplitudes of both can be optimized by setting separate pit depths for super-resolution pits 111 and non-super-resolution pits 110.

When separate pit depths are set for super-resolution pits 111 and non-super-resolution pits 110, the pit depth $d_s$ of the super-resolution pits 111 can be set in one of the preferable ranges stated above, and the depth of the non-super-resolution pits 110 can be set in the range from $\lambda/(7n)$ to $\lambda/(3n)$.

When the same value is set for all pits, all the pit depths are preferably set in the range of overlap of the above preferable ranges for the depth $d_s$ of the super-resolution pits 111 and the range from $\lambda/(7n)$ to $\lambda/(3n)$.

In this case, since the pit depths for maximizing the reproduced signal amplitudes obtained from super-resolution pits 111 and non-super-resolution pits 110 differ from each other, the reproduced signal amplitude obtained from the super-resolution pits 111 is preferably increased as much as possible while the reproduced signal intensity obtained from the non-super-resolution pits 110 with relatively large amplitudes is reduced, so that the reproduced signal quality is satisfactory overall.

This can reduce the number of pit depth values on a ROM master disc to one, eliminating the need to use photoresists with two different sensitivities to provide a plurality of pit depths within the same master disc and enabling the master disc to be manufactured by a comparatively simple process.

The optical information recording medium 1 according to the first embodiment is configured so as to provide backward compatibility, which is the property having at least the same functionality as an optical disc (e.g., a BD) using only recording marks having lengths equal to or greater than the diffraction limit. To provide backward compatibility here means that the optical information recording medium 1 according to the first embodiment (the more advanced optical information recording medium) permits recording or reproduction by an optical disc recording/reproducing device with a light source having the same light wavelength and an objective lens having the same numerical aperture as the light source and objective lens used for recording or reproduction on an optical disc using only recording marks having lengths equal to or greater than the diffraction limit (a less advanced optical information recording medium; e.g., a BD). Therefore, in principle, information in the optical information recording medium 1 according to the first embodiment is reproducible by conventional optical disc reproducing devices.

Diverse embodiments of the invention have been described above with reference to the drawings, but these are illustrative examples of the invention; various embodiments other than the above may be employed. For example, the exemplary structure of the optical information recording medium 1 is that of a ROM disc, but this is not a limitation.

The above preferred pit depth setting ranges are also applicable to the depths of recording marks in recordable types of information recording media having a super-resolution functional layer.

Second Embodiment

A recording/reproducing device according to a second embodiment will now be described. The recording/reproducing device according to the second embodiment is a device capable of forming recording marks in an optical information recording medium 2 (a super-resolution optical disc 2) to which the invention is applied in order to record information data in the super-resolution optical disc, and reproducing the information data from the recording marks formed in the super-resolution optical disc 2 (or the super-resolution optical disc 1, which is the optical information recording medium according to the first embodiment).

The exemplary optical information recording medium 1 according to the first embodiment is a reproduction-only type of super-resolution optical disc. When the optical information recording medium 1 according to the first embodiment is used, if the pit depth $d_s$ is appropriately selected according to the phase difference between the reflected light (central light) in the optical aperture (reference character 12a in FIG. 1(A)) where the optical characteristics have been locally altered in the super-resolution functional layer (reference character 12 in FIG. 1(A)) and the reflected light (peripheral light) in the periphery around the optical aperture, the amplitude of the reproduced signal in the recording/reproducing device can be increased. With a recordable super-resolution optical disc as well, as with the reproduction-only type of super-resolution optical disc (the first embodiment), if the depth of the recording marks formed in the recordable super-resolution optical disc is appropriately selected according to the reflectance of the super-resolution functional layer and the phase difference between the central light and the peripheral light, the amplitude of the reproduced signal in the recording/reproducing device can be increased.

Figure 6:
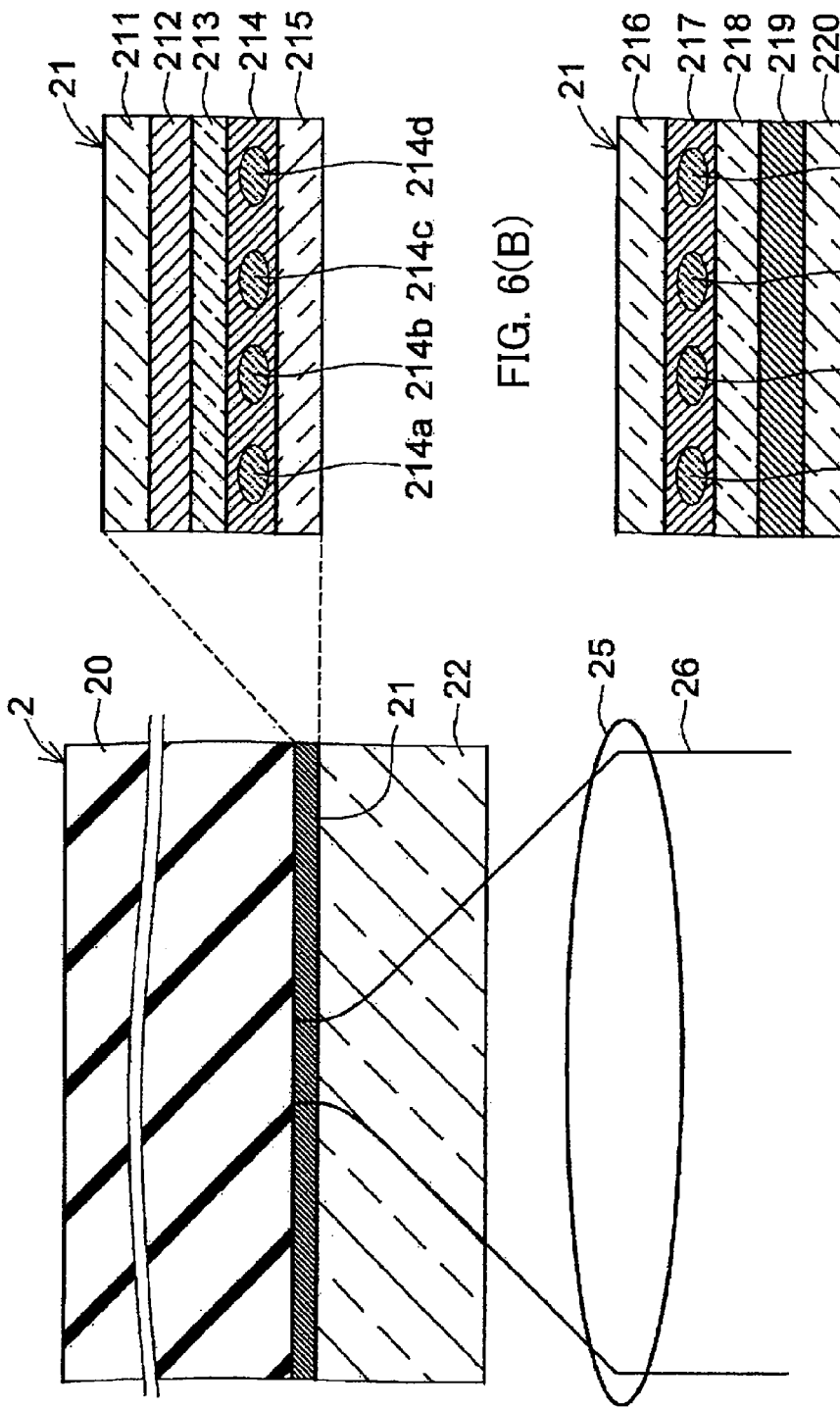
FIG. 6(A) is a schematic sectional diagram showing an example of the structure of a recordable optical information recording medium loaded into a recording/reproducing device according to a second embodiment of the invention.
FIG. 6(B) is a schematic sectional diagram showing an exemplary super-resolution functional layer.
FIG. 6(C) is a schematic sectional diagram showing another exemplary super-resolution functional layer.

FIG. 6(A) is a schematic sectional diagram showing an example of the structure of a super-resolution functional layer 21 of the super-resolution optical disc 2, which is a recordable optical information recording medium; FIG. 6(B) is a schematic sectional diagram showing an example of the super-resolution functional layer 21; FIG. 6(C) is a schematic sectional diagram showing another example of the super-resolution functional layer 21.

As shown in FIG. 6(A), the recordable super-resolution optical disc 2 includes a substrate 20 made of polycarbonate or glass or the like, a super-resolution multilayer film (super-resolution functional layer) 21 formed on the substrate 20, and a protective layer 22 covering the super-resolution multilayer film 21. The protective layer 22 is made of a material that transmits a laser beam focused by a focusing optical system 25 of an optical pickup. The protective layer 22 can be formed, for example, by bonding of a thin light-transmitting plastic sheet by use of a transparent bonding layer, or by application of an ultraviolet-curable resin by a spin coating method and curing by ultraviolet irradiation.

As illustrated in FIG. 6(B), the super-resolution functional layer 21 has a laminated structure with a dielectric layer 211, a nonlinear material layer 212, a dielectric layer 213, a recording layer 214, and a dielectric layer 215.

The recording layer 214 includes a layer of a noble metal oxide such as, for example, platinum oxide ($PtO_x$), silver oxide ($AgO_x$), or palladium oxide ($PdO_x$). The thickness of the recording layer 214 is preferably within the range from several nm to several hundred nm. The nonlinear material layer 212 can be formed from any one of a Ge—Sb—Te-based material, an Ag—In—Sb—Te-based material, an Sb—Te-based material, and an In—Sb-based material. When the recording layer 214 is irradiated with a high intensity focused laser beam for recording, it absorbs the energy of the laser beam, is locally subjected to thermal decomposition, and is deformed. Recording marks (bubble pits) 214a, 214b, 214c, 214d with a size smaller than the diffraction limit $\lambda/(4n)$ determined by the NA of the focusing optical system 25 and the wavelength $\lambda$ of the laser beam 26 are thereby formed in the recording layer 214. During irradiation by a focused reproducing laser beam, a super-resolution phenomenon causing a change in optical characteristics in a local region smaller than the diffraction limit is thought to occur in the nonlinear material layer 212, generating localized light. The localized light interacts with the recording marks 214a, 214b, 214c, 214d and is thereby converted to reproduced light (optical propagating light).

The dielectric layers 211, 213, 215 have the function of, for example, preventing thermal diffusion of the constituent material of the recording layer 214 or the nonlinear material layer 212. The dielectric layers 211, 213, 215 can be formed using ZnS—$SiO_2$ or AlN, for example. Provision of dielectric layers 211 and 215 can improve the reproduction durability performance of the recording layer 214 or the nonlinear material layer 212. The super-resolution multilayer film 21 may, if necessary, include an interference layer for generating optical multimode interference.

Alternatively, as shown in FIG. 6(C), the super-resolution multilayer film 21 may include a dielectric layer 216, a recording layer 217, a dielectric layer 218, a super-resolution mask layer 219, and a dielectric layer 220. The recording layer 217 may be formed from platinum oxide ($PtO_x$) or silver oxide ($AgO_x$) as illustrated in FIG. 6(B), for example. The super-resolution mask layer 219 may be formed from a phase change material: for example, from one of a Ge—Sb—Te-based material, an Ag—In—Sb—Te-based material, an Sb—Te-based material, or an In—Sb-based material. The dielectric layers 216, 218, 220 can be formed using a nitride material such as AlN or SiN, for example. When the super-resolution mask layer 219 is irradiated by a focused reproducing laser beam, its optical characteristics change in a local region smaller than the diffraction limit, forming a tiny optical aperture. The localized light generated in this tiny optical aperture interacts with recording marks 217a, 217b, 217c, 217d and is thereby converted into reproduced light (propagating light).

FIGS. 6(B) and 6(C) show examples of the structure of the super-resolution multilayer film 21. FIGS. 6(A) to 6(C) do not limit the structure, the number of films, or the constituent materials of the super-resolution multilayer film 21. For example, the super-resolution multilayer film 21 may have a structure in which a conductive layer, a super-resolution mask layer of platinum oxide ($PtO_x$) or silver oxide ($AgO_x$), a dielectric layer, a recording layer formed from a Ge—Sb—Te-based phase change recording material doped with Fe, Zn, or Bi, and another dielectric layer are laminated in this sequence from the light incidence side. The dielectric layer in this case may be formed from a nitride material such as, for example, AlN or SiN.

The recording marks (bubble pits) 214a, 214b, 214c, 214d play the same role as the pits of a reproduction-only super-resolution optical disc (reference character 1 in FIG. 1(A)).

The super-resolution functional layer 21 of the recordable super-resolution optical disc 2 described in the second embodiment is not necessarily of the type that forms bubble pits; it may be any other type of super-resolution functional layer having a structure capable of forming recording marks on a super-resolution optical disc by irradiation with light.

The recording/reproducing device according to the second embodiment will now be described. The recording/reproducing device according to the second embodiment controls the optical irradiation pattern during recording so that the depth $d_s$ of the recording marks is suitable for increasing the reproduced signal amplitude in the recordable super-resolution optical disc 2, as in the optical information recording medium 1 according to the first embodiment. The depth $d_s$ of a recording mark can be varied depending on the optical irradiation intensity; when the optical irradiation intensity is increased, the depth $d_s$ of the recording mark can be increased; when the optical irradiation intensity is reduced, the depth $d_s$ of the recording mark can be reduced.

Figure 7:
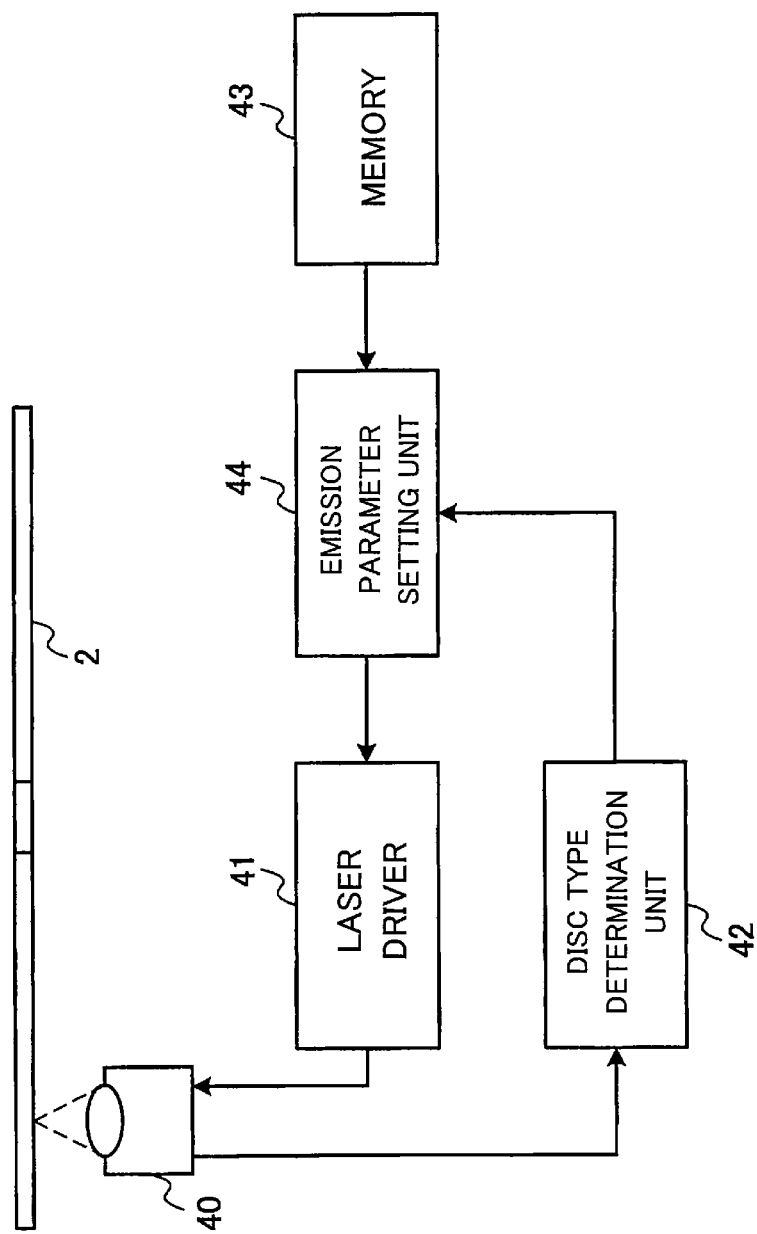
FIG. 7 is a block diagram schematically showing the main elements of the recording/reproducing device according to the second embodiment.

FIG. 7 is a diagram schematically showing the elements that carry out the main functions in recording by the recording/reproducing device according to the second embodiment. As shown in FIG. 7, the recording/reproducing device according to the second embodiment has an optical pickup (optical head) 40. The optical pickup 40 includes a laser source emitting a laser beam that irradiates an optical disc rotated by the torque of a spindle motor and a light detection unit that detects a return laser beam reflected by the rotating optical disc. The recording/reproducing device according to the second embodiment includes a laser driver (laser driving unit) 41 for causing the laser source mounted in the optical pickup 40 to emit light and a disc type determination unit 42 for determining the type of an optical disc on which recording or reproduction is to be performed, on the basis of a detection signal from the light detection unit in the optical pickup 40. The recording/reproducing device according to the second embodiment further includes a memory (setting information storage unit) 43 in which emission parameters for emission patterns associated with the optical disc types are recorded and held and an emission parameter setting unit (laser irradiation intensity setting unit) 44 for selectively reading emission parameters used by the laser driver 41 from the memory 43 on the basis of optical disc type determination information obtained by the disc type determination unit 42 and sending the emission parameters thus read to the laser driver 41. The recording/reproducing device according to the second embodiment also includes a reproducing circuit for generating a reproduced signal on the basis of the detection signal from the light detection unit of the optical pickup 40 and a control circuit for controlling the operation of the entire device.

The recording/reproducing device according to the second embodiment irradiates the recording layer of the recordable super-resolution optical disc 2 with a focused spot by means of the optical pickup 40 and controls emission so as to suit each of the recording mark lengths to which the recording data are converted, thereby performing recording. This emission control causes the laser source to emit light for each recording mark so that excellent reproduced signal quality during reproduction is maintained. With this emission control, by performing recording with an emission pattern that increases the amplitude of the reproduced signal from a relatively short recording mark length, for example, the quality of the reproduced signal waveform is improved and read-out errors of the recorded data are suppressed.

The disc type determination unit 42 determines the type of super-resolution optical disc on the basis of the reflected light level, the number of recording layers, or information recorded in an inner circumference area indicating whether or not the optical disc is a super-resolution optical disc and giving the disc manufacturer and other disc attributes.

Pre-associated disc types and light irradiation patterns are recorded in advance in the memory 43. For the irradiation patterns, the structures (the material of the super-resolution functional layer or the recording layer or the film thickness of each layer) of super-resolution optical discs discriminated by additional information such as the manufacturer and date of manufacture are ascertained in advance, and, the reflectance ratio $R_{sr}/R_{nr}$ and phase difference $\Delta\phi$ are calculated for each disc type.

For the relationships among the reflectance ratio $R_{sr}/R_{nr}$ the phase difference $\Delta\phi$, the recording mark depth $d_s$, and the reproduced signal amplitude, characteristic curves such as shown for the optical information recording medium 1 in the first embodiment in FIGS. 3 and 4 are assumed here to be known. Then from these known characteristic curves, the recording mark depth $d_s$ at which an increased reproduced signal amplitude can be obtained is determined and the light irradiation pattern with which the determined recording mark depth $d_s$ is formed during recording is determined in advance. This enables disc types and recording light irradiation patterns to be associated in advance.

Associating disc types with recording light irradiation patterns on the basis of the relationships among the reflectance ratio $R_{sr}/R_{nr}$, phase difference $\Delta\phi$, recording mark depth $d_s$, and reproduced signal amplitude stated in the description of the optical information recording medium in the first embodiment is particularly useful in markedly increasing the maximum peak (the first type of peak) of the reproduced signal amplitude, as follows.

That is, when the disc type determination unit 42 determines that the disc is an optical disc having a super-resolution functional layer and a recording layer such that the reflectance ratio $R_{sr}/R_{nr}$ is 1 or greater and the polarity of the phase difference $\Delta\phi$ is negative, the reproduced signal amplitude during reproduction can be efficiently increased by selecting emission parameters that set the optical irradiation intensity during recording to a small value, making the recording mark depth $d_s$ smaller than $\lambda/(4n)$, and driving them with the laser driver 41.

When the disc type determination unit 42 determines that the disc is an optical disc having a super-resolution functional layer and a recording layer such that the reflectance ratio $R_{sr}/R_{nr}$ is 1 or greater and the polarity of the phase difference $\Delta\phi$ is positive, the reproduced signal amplitude during reproduction can be efficiently increased by selecting emission parameters that set the optical irradiation intensity during recording to a large value, making the recording mark depth $d_s$ larger than $\lambda/(4n)$, and driving them with the laser driver 41.

As described in the explanation of the optical information recording medium 1 according to the first embodiment, characteristic curves distinctly having a first type of peak and a second type of peak appear when the absolute phase difference value $|\Delta\phi|$ is 10 degrees or more. In order to gain a definite increasing effect on reproduced signal intensity or in order to enable a definite selection regarding a shallow or deep pit depth $d_s$, an absolute phase difference value $|\Delta\phi|$ of 10 degrees or more is desirable.

As described above, the recording/reproducing device according to the second embodiment enables the efficient setting of a recording optical irradiation intensity or an emission pattern that will yield excellent reproduced signal quality during reproduction, on recordable super-resolution optical discs associated therewith according to combinations of the reflectance ratio $R_{sr}/R_{nr}$ and the polarity of the phase difference $\Delta\phi$, which are optical characteristics of the super-resolution functional layer 21.

The optical information recording medium 2 is structured so as to have backward compatibility, which is the property of providing at least the same functionality as an optical disc (e.g., a BD) using only recording marks having lengths equal to or greater than the diffraction limit. The optical information recording medium 2 thus can be used in a conventional optical disc reproducing device (e.g., a BD player) in the same way as a conventional optical disc.

REFERENCE CHARACTERS

1 optical information recording medium (super-resolution optical disc), 10 substrate, 11 recording layer, 111 super-resolution pit, 110 non-super-resolution pit, 12 super-resolution functional layer (super-resolution multilayer film), 12a optical aperture, 121 dielectric layer, 122 interference layer, 123, 212 nonlinear material layer, 124 interference layer, 125 dielectric layer, 13 protective layer, 25 focusing optical system, 32 focused spot, 32c central light, 32p peripheral light, 2 optical information recording medium (super-resolution optical disc), 20 substrate, 21 super-resolution functional layer (super-resolution multilayer film), 211, 213, 215, 220 dielectric layer, 212 nonlinear material layer, 214, 217 recording layer, 214a-214d, 217a-217d recording mark, 219 super-resolution mask layer, 22 protective layer, 40 optical pickup (optical head), 41 laser driver (laser driving unit), 42 disc type determination unit, 43 memory (setting information storage unit), 44 emission parameter setting unit (laser irradiation intensity setting unit).

What is claimed is:
1. An optical information recording medium comprising:
a recording layer in which at least one recording mark is formed;
a super-resolution functional layer that, when irradiated by a laser beam focused by a focusing optical system, enables information to be reproduced from the recording mark having a length shorter than a diffraction limit determined by optical performance of the focusing optical system and wavelength of the laser beam; and
a protective layer that covers the recording layer and the super-resolution functional layer and transmits the laser beam; wherein:
letting n be the refractive index of the protective layer with respect to the laser beam, $\lambda$ be the wavelength of the laser beam, and $d_s$ be the depth of the recording mark,
when irradiated by the focused laser beam, the super-resolution functional layer forms a focused light spot on the recording layer, the focused light spot including central light that irradiates the recording mark and peripheral light that irradiates a region outside the central light,
a condition $d_s > \lambda/4n$ is satisfied when the central light has a positive phase difference with respect to the peripheral light, and a condition $d_s<\lambda/4n$ is satisfied when the central light has a negative phase difference with respect to the peripheral light.

2. The optical information recording medium of claim 1, wherein the positive phase difference or the negative phase difference has an absolute value of at least ten degrees.

3. The optical information recording medium of claim 2, wherein the depth of a recording mark formed in the recording layer and having a length equal to or greater than the diffraction limit differs from the depth $d_s$ of the recording mark having a length shorter than the diffraction limit, the depth of the recording mark having a length equal to or greater than the diffraction limit differing from $\lambda/4n$ by less than does the depth $d_s$ of the recording mark having a length shorter than the diffraction limit.

4. The optical information recording medium of claim 3, wherein the optical information recording medium possesses backward compatibility by possessing at least characteristics having functionality identical to functionality possessed by an optical disc using only recording marks having lengths equal to or greater than the diffraction limit.

5. The optical information recording medium of claim 4, wherein the optical disc using only recording marks having lengths equal to or greater than the diffraction limit is a Blu-ray disc.

6. The optical information recording medium of claim 2, wherein the optical information recording medium possesses backward compatibility by possessing at least characteristics having functionality identical to functionality possessed by an optical disc using only recording marks having lengths equal to or greater than the diffraction limit.

7. The optical information recording medium of claim 6, wherein the optical disc using only recording marks having lengths equal to or greater than the diffraction limit is a Blu-ray disc.

8. The optical information recording medium of claim 1, wherein the depth of a recording mark formed in the recording layer and having a length equal to or greater than the diffraction limit differs from the depth $d_s$ of the recording mark having a length shorter than the diffraction limit, the depth of the recording mark having a length equal to or greater than the diffraction limit differing from $\lambda/4n$ by less than does the depth $d_s$ of the recording mark having a length shorter than the diffraction limit.

9. The optical information recording medium of claim 8, wherein the optical information recording medium possesses backward compatibility by possessing at least characteristics having functionality identical to functionality possessed by an optical disc using only recording marks having lengths equal to or greater than the diffraction limit.

10. The optical information recording medium of claim 9, wherein the optical disc using only recording marks having lengths equal to or greater than the diffraction limit is a Blu-ray disc.

11. The optical information recording medium of claim 1, wherein the optical information recording medium possesses backward compatibility by possessing at least characteristics having functionality identical to functionality possessed by an optical disc using only recording marks having lengths equal to or greater than the diffraction limit.

12. The optical information recording medium of claim 11, wherein the optical disc using only recording marks having lengths equal to or greater than the diffraction limit is a Blu-ray disc.

13. A recording/reproducing device for recording information data on or reproducing information data from the optical information recording medium of claim 1 comprising:
an optical head for irradiating the optical information recording medium with the laser beam and detecting a returning laser beam from the optical information recording medium;
a laser driving unit for driving the optical head and controlling an irradiation intensity of the laser beam when information data are recorded on the optical information recording medium;
a disc type determination unit for determining the type of the optical information recording medium;
a setting information storage unit for holding setting information concerning the irradiation intensity of the laser beam, the setting information being based on a phase difference between central light in a focused spot formed on the recording layer by the laser beam when the super-resolution functional layer is irradiated by the laser beam and peripheral light that irradiates a region outside the central light, and on a ratio of a reflectance of the central light to a reflectance of the peripheral light that irradiates the region outside the central light; and
a laser irradiation intensity setting unit for setting the irradiation intensity of the laser beam by selecting the irradiation intensity of the laser beam from among the setting information concerning the irradiation intensity of the laser beam held in the setting information storage unit on a basis of disc type information determined by the disc type determination unit, and sending the setting information concerning the selected irradiation intensity to the laser driving unit.

14. An optical information recording medium comprising:
a recording layer in which at least one recording mark is formed;
a super-resolution functional layer that, when irradiated by a laser beam focused by a focusing optical system, enables information to be reproduced from the recording mark having a length shorter than a diffraction limit determined by optical performance of the focusing optical system and wavelength of the laser beam; and
a protective layer that covers the recording layer and the super-resolution functional layer and transmits the laser beam; wherein:
letting n be the refractive index of the protective layer with respect to the laser beam, $\lambda$ be the wavelength of the laser beam, and $d_s$ be the depth of the recording mark,
the super-resolution functional layer is configured to form both a first type of peak and a second type of peak when the depth $d_s$ of the recording mark having a length shorter than the diffraction limit is within a range from 0 to $\lambda/2$, the first type of peak being a maximum of a reproduced signal amplitude, the second type of peak being a local maximum at which the reproduced signal amplitude is less than at the first type of peak, and
the depth $d_s$ of the recording mark is a pit depth that produces the first type of peak or a pit depth that produces the second type of peak.

15. The optical information recording medium of claim 14, wherein the depth of a recording mark formed in the recording layer and having a length equal to or greater than the diffraction limit differs from the depth $d_s$ of the recording mark having a length shorter than the diffraction limit, the depth of the recording mark having a length equal to or greater than the diffraction limit differing from λ/4n by less than does the depth $d_s$ of the recording mark having a length shorter than the diffraction limit.

16. The optical information recording medium of claim 15, wherein the optical information recording medium possesses backward compatibility by possessing at least characteristics having functionality identical to functionality possessed by an optical disc using only recording marks having lengths equal to or greater than the diffraction limit.

17. The optical information recording medium of claim 16, wherein the optical disc using only recording marks having lengths equal to or greater than the diffraction limit is a Blu-ray disc.

18. The optical information recording medium of claim 14, wherein the optical information recording medium possesses backward compatibility by possessing at least characteristics having functionality identical to functionality possessed by an optical disc using only recording marks having lengths equal to or greater than the diffraction limit.

19. The optical information recording medium of claim 18, wherein the optical disc using only recording marks having lengths equal to or greater than the diffraction limit is a Blu-ray disc.

20. A recording/reproducing device for recording information data on or reproducing information data from the optical information recording medium of claim 14 comprising:
   an optical head for irradiating the optical information recording medium with the laser beam and detecting a returning laser beam from the optical information recording medium;
   a laser driving unit for driving the optical head and controlling an irradiation intensity of the laser beam when information data are recorded on the optical information recording medium;
   a disc type determination unit for determining the type of the optical information recording medium;
   a setting information storage unit for holding setting information concerning the irradiation intensity of the laser beam, the setting information being based on a phase difference between central light in a focused spot formed on the recording layer by the laser beam when the super-resolution functional layer is irradiated by the laser beam and peripheral light that irradiates a region outside the central light, and on a ratio of a reflectance of the central light to a reflectance of the peripheral light that irradiates the region outside the central light; and
   a laser irradiation intensity setting unit for setting the irradiation intensity of the laser beam by selecting the irradiation intensity of the laser beam from among the setting information concerning the irradiation intensity of the laser beam held in the setting information storage unit on a basis of disc type information determined by the disc type determination unit, and sending the setting information concerning the selected irradiation intensity to the laser driving unit.

* * * * *